(12) United States Patent
Sueoka et al.

(10) Patent No.: US 8,556,245 B2
(45) Date of Patent: Oct. 15, 2013

(54) WORK INSPECTOR AND CARRIER

(75) Inventors: Hisayuki Sueoka, Tokyo (JP); Souta Ohga, Tokyo (JP); Yoshiaki Araki, Tokyo (JP)

(73) Assignee: Hirata Corporation, Tokyo (JP)

( * ) Notice: Subject to any disclaimer, the term of this patent is extended or adjusted under 35 U.S.C. 154(b) by 362 days.

(21) Appl. No.: 12/922,922

(22) PCT Filed: Mar. 19, 2008

(86) PCT No.: PCT/JP2008/055055
§ 371 (c)(1),
(2), (4) Date: Sep. 16, 2010

(87) PCT Pub. No.: WO2009/116144
PCT Pub. Date: Sep. 24, 2009

(65) Prior Publication Data
US 2011/0057373 A1    Mar. 10, 2011

(51) Int. Cl.
| B23Q 1/25 | (2006.01) |
| B23Q 1/64 | (2006.01) |
| B23Q 3/00 | (2006.01) |
| B25B 11/00 | (2006.01) |
| B25B 1/22 | (2006.01) |
| B65G 47/10 | (2006.01) |
| B65G 17/00 | (2006.01) |

(52) U.S. Cl.
USPC ............. 269/56; 269/21; 269/55; 269/71; 269/75; 269/289 R; 198/370.01; 198/793

(58) Field of Classification Search
USPC .............. 269/55, 56, 71, 75, 60, 289 R
See application file for complete search history.

(56) References Cited

U.S. PATENT DOCUMENTS

| 2007/0152616 A1* | 7/2007 | Salamanca ............... 318/568.11 |
| 2007/0153260 A1* | 7/2007 | Salamanca ............... 356/237.1 |
| 2010/0023297 A1* | 1/2010 | Kikuchi et al. ............... 702/150 |
| 2011/0024264 A1* | 2/2011 | Tokunaga et al. .......... 198/478.1 |

FOREIGN PATENT DOCUMENTS

| JP | 61-35506 | 10/1986 |
| JP | 61-265522 | 11/1986 |
| JP | 5-172697 | 7/1993 |
| JP | 6-55340 | 3/1994 |

(Continued)

OTHER PUBLICATIONS

International Search Report issued May 1, 2008 in International (PCT) Application No. PCT/JP2008/055055.

*Primary Examiner* — Monica Carter
*Assistant Examiner* — Seahee Yoon
(74) *Attorney, Agent, or Firm* — Wenderoth, Lind & Ponack, LLP

(57) ABSTRACT

A work inspector and carrier includes a carrier unit (40, 50, 60) for carrying a workpiece from a carry-in area to a carry-out area, and an inspection unit (70) for performing a predetermined inspection on the workpiece. The carrier unit is formed so as to move the inspection unit (70) together with the workpiece in order to carry the workpiece from the carry-in area to the carry-out area while performing the inspection by the inspection unit. When carrying the workpiece from the carry-in area to the carry-out area, the inspection unit performs the predetermined inspection on the workpiece while being moved together with the workpiece. Thus, the overall time required for inspection and transportation can be reduced.

6 Claims, 9 Drawing Sheets

(56) References Cited

FOREIGN PATENT DOCUMENTS

| | | |
|---|---|---|
| JP | 7-325040 | 12/1995 |
| JP | 8-240539 | 9/1996 |
| JP | 2003-202275 | 7/2003 |
| JP | 2007-144546 | 6/2007 |

* cited by examiner it is an object of the present invention to provide a work inspector
WORK INSPECTOR AND CARRIER

BACKGROUND OF THE INVENTION

1. Technical Field

The present invention relates to a work inspector and carrier that carries a workpiece such as a mechanical component or an electronic component while inspecting the workpiece, and more particularly to a work inspector and carrier that carries a planetary gear mechanism while inspecting an assembled state of the planetary gear mechanism (detecting, e.g., a load torque).

2. Description of the Related Art

As a conventional inspector that inspects gears and others, there is known an inspector which includes a carrying means for carrying a gear to a predetermined inspecting position, a rotation mechanism that rotates at the inspecting position the gear placed at the inspecting position, a defect detecting means for detecting a defect from the gear rotated by the rotation mechanism, a sorting means for sorting a gear having a defect detected by the defect detecting means and a gear having no defect and carrying the gears out of the inspecting position, and others, and which has a configuration that each gear is rotated by the rotation mechanism after the gear is positioned at the inspecting position by the carrying means. The presence/absence of a defect is inspected by the defect detecting means and the inspected gear is sorted and carried by the sorting means (see, e.g., Unexamined Japanese Patent Publication No. 5-172697).

Further, as another inspector, there is known an inspector which includes: a turntable that is intermittently rotated with a gear mounted thereon; a tooth tip shape inspection mechanism that is arranged to overlap the turntable and inspects a tooth tip shape of the gear placed at a predetermined inspecting position; a tooth groove shape inspection mechanism that is arranged to overlap the turntable and inspects a tooth groove shape of the gear; and others, and which has a configuration that the gear is carried (mounted) onto the turntable. The turntable is intermittently rotated in a predetermined angle steps to position the gear at a predetermined inspecting position, a tooth tip shape and a tooth groove shape of the gear are sequentially inspected and the inspected gear is sequentially carried (taken out) (see, e.g., Unexamined Japanese Patent Publication No. 6-55340).

However, in these inspectors, the gear carried-in is positioned at a predetermined inspecting position, a predetermined inspection is performed with respect to the gear at the inspecting position, and the inspected gear is carried out to a predetermined carry-out area.

That is, since a series of operations, i.e., carry-in of the gear to the inspecting position, inspection of the gear at the inspecting position and carrying-out of the inspected gear are sequentially performed in the mentioned order, an inspection process and a carrying process are separately required in time series and, in case the inspection process is included as a part of a gear manufacturing process (carrying-in of a material, processing of the gear, inspection of the gear and carrying-out of the gear), the entire manufacturing process becomes long, and there is a limitation on any increase in productivity.

As still another inspector, there is known an inspector which includes: an outer cylindrical body having internal teeth; a plurality of planetary gears that mesh with the internal teeth and have a workpiece receiving hole at the center; a workpiece holding mechanism provided to each of the planetary gears; a sun gear that meshes with the planetary gears; a plurality of CCD cameras arranged around the outer cylindrical body; and others, and which has a configuration in which a workpiece is inserted into the workpiece receiving hole of the planetary gears to be held by a workpiece holding mechanism at a predetermined workpiece supply position. The plurality of CCD cameras take pictures of an outer periphery of the workpiece that changes its direction together with planetary gears that rotate on their axes and orbitally move when the sun gear is rotated so that the outer periphery of the workpiece can be inspected and the inspected workpiece is discharged from a workpiece discharge position (see, e.g., Unexamined Japanese Patent Publication No. 7-325040).

In this inspector, in an inspection area defined by an orbital region of the planetary gears, the workpiece is inspected while being moved (rotated on its axis and orbitally moved).

However, the workpiece must be moved to perform an inspection and, in case an inspection process is included as a part of a gear manufacturing process, this inspection process must be provided before carrying the gear subjected to predetermined processing to a predetermined carry-out area, and the inspected gear must be carried out to a predetermined carry-out area in a carrying process. That is, since a series of operations, i.e., carrying-in of the gear to the inspection area, inspection of the gear in the inspection area and carrying-out of the inspected gear are sequentially performed in the mentioned order, the inspection process and the carrying process are separately required in time series, and the entire manufacturing process becomes long and there is a limitation on any increase in productivity as described above.

SUMMARY OF THE INVENTION

1. Problem to be Solved by the Invention

In view of the above-described conventional arts, it is an object of the present invention to provide a work inspector and carrier that inspects and carries a workpiece such as a mechanical component or an electronic component while achieving simplification of a construction, miniaturization of the apparatus, realization of a low cost, reduction in entire time required for inspection and carriage and others, and more particularly to provide a work inspector and carrier that carries a planetary gear mechanism while inspecting an assembled state (detecting, e.g., a load torque) of the planetary gear mechanism.

2. Means for Solving the Problem

A work inspector and carrier according to the present invention that achieves the object includes a carrier unit that carries a workpiece from a carry-in area to a carry-out area, and an inspection unit that performs predetermined inspection with respect to the workpiece. The carrier unit is formed to move the inspection unit together with the workpiece in order to carry the workpiece from the carry-in area to the carry-out area while performing the predetermined inspection by the inspection unit.

According to this configuration, when carrying the workpiece from the predetermined carry-in area to the carry-out area by using the carrier unit, the inspection unit performs the predetermined inspection with respect to the workpiece while being moved (carried) together with the workpiece, whereby the entire time required for the inspection and the carriage can be reduced as compared with a case where the workpiece is stopped at the predetermined inspecting position to be subjected to inspection and then the workpiece is carried (the inspection and the carriage are separately independently carried out).

In the above-described configuration, it is possible to adopt a configuration in which the carrier unit includes a holding unit that is capable of holding the workpiece and is driven to be movable between the carry-in area and the carry-out area, and the inspection unit includes an inspecting portion that comes into contact with the workpiece held by the holding unit to perform predetermined inspection.

According to this configuration, since the workpiece carried into the carry-in area is subjected to the predetermined inspection by the inspecting portion in the inspection unit in a state in which the workpiece is held by the holding unit, the workpiece can be assuredly positioned at the predetermined holding position to be carried, whereby the predetermined inspection can be highly accurately performed.

In the above-described configuration, it is possible to adopt a configuration in which the carrier unit includes a lifting and lowering holder that is supported so as to be capable of moving up and down while holding the holding unit and the inspection unit together, a lifting and lowering drive mechanism that drives the lifting and lowering holder to move up and down, and a horizontal drive mechanism that drives the lifting and lowering holder in a horizontal direction.

According to this configuration, the operation that the holding unit moves up and down to hold and release the workpiece, the operation that the inspection unit comes into contact with the workpiece to start inspection (prepare inspection) and the operation that the inspection unit is separated from or moves away from the workpiece to finish the inspection (or the operation that the inspection unit is separated from or moves away from the workpiece in a state that the inspection has been already finished) can be synchronized through the lifting and lowering holder, and simplification of the lifting and lowering drive mechanism, i.e., the entire apparatus, miniaturization, reduction in cost and others can be achieved as compared with a case where the holding unit and the inspection unit are separately driven to move up and down.

In the above-described configuration, it is possible to adopt a configuration in which the carrier unit includes a horizontal drive mechanism that linearly drives the holding unit and the inspection unit together in a horizontal direction, and the horizontal drive mechanism is operable to carry the workpiece to a first carry-out position to which the workpiece accepted by the inspection unit is carried out and to a second carry-out position to which the workpiece rejected by the inspection unit is carried out.

According to this configuration, the workpiece is carried by the horizontal drive mechanism to the first carry-out position or the second carry-out position which are linearly aligned, i.e., the workpiece accepted by the inspection unit is carried to the first carry-out position, and the workpiece rejected by the inspection unit is carried to the second carry-out position. Since the workpiece is linearly (one-dimensionally) carried in the horizontal direction, simplification of the carrier unit, i.e., the entire apparatus, miniaturization, reduction in cost and others can be achieved as compared with a case where the workpiece is two-dimensionally carried on a horizontal plane.

In the above-described configuration, it is possible to adopt a configuration in which the holding unit includes a grasping arm that grasps the workpieces; and an arm drive mechanism that drives the grasping arm. According to this configuration, the workpiece can be grasped or released at a desired timing by driving the grasping arm using the arm drive mechanism, and the workpiece can be assuredly held and carried even if the workpiece is a relatively heavyweight item.

In the above-described configuration, it is possible to adopt a configuration in which the inspection unit includes a sun gear that is capable of meshing with planetary gears of the workpiece to define the inspecting portion, a rotation drive mechanism that drives the sun gear to rotate, and a load detection mechanism that detects a load of the rotation drive mechanism.

According to this configuration, in a case of applying the planetary gear mechanism with no sun gear incorporated therein as a workpiece, the sun gear (the inspecting portion) of the inspection unit is meshed with the planetary gears of the workpiece, the sun gear is rotated by the rotation drive mechanism, and a load torque thereof is detected by the load detection mechanism, whereby the inspection whether or not the planetary gear mechanism is adequately assembled can be achieved.

In the above-described configuration, it is possible to adopt a configuration in which the inspection unit includes a pressing mechanism that increases pressing force in a direction along which the sun gear meshes with the planetary gears while making the sun gear come into contact with the planetary gears and stopping downward movement of the sun gear in accordance with a load against the meshing operation when moving down the sun gear to mesh with the planetary gears of the workpiece.

According to this configuration, at the time that the sun gear (the inspecting portion) of the inspection unit moves down to mesh with the planetary gears of the workpiece, when the sun gear does not smoothly mesh with the planetary gear, the sun gear comes into contact with the planetary gears to stop further downward movement, the pressing mechanism increases pressing force of the sun gear, and the sun gear is assuredly meshed with the planetary gears in accordance with the increase in pressing force.

Therefore, the sun gear can be prevented from being forcibly pressed against the planetary gears to be destroyed, and the sun gear can be assuredly meshed with the planetary gears.

In the above-described configuration, it is possible to adopt a configuration in which the inspection unit includes a mesh detection mechanism that detects whether or not the sun gear has meshed with the planetary gears of the workpiece.

According to this configuration, the mesh detection mechanism can detect whether or not the sun gear has meshed with the planetary gear, and the inspection can be highly accurately and smoothly performed based on a detection signal of this detection.

In the above-described configuration, it is possible to adopt a configuration in which the rotation drive mechanism includes a drive source fixed to the lifting and lowering holder, and a drive shaft that is driven to rotate by the drive source and connects the sun gear at a lower end thereof, and the pressing mechanism includes an upper shaft driven to rotate by the drive source and a lower shaft that is connected to the upper shaft to be movable in an axial direction and to integrally rotate with the upper shaft and connects the sun gear at a lower end thereof so that the upper shaft and the lower shaft define the drive shaft, and an urging spring that downwardly urges the lower shaft with respect to the upper shaft.

According to this configuration, the sun gear is driven to rotate through the drive shaft (the upper side and the lower shaft) by the drive source, the lifting and lowering holder moves down and the lower shaft relatively upwardly moves with respect to the upper shaft against an urging force of the urging spring when the sun gear does not smoothly mesh with the planetary gears, thereby preventing the sun gear from moving down together with the lifting and lowering holder to be forcibly pressed against the planetary gears which may result in breakage of components, biting, inoperability and others.

In the above-described configuration, it is possible to adopt a configuration in which the pressing mechanism includes an adjustment portion that adjusts the urging force of the urging spring.

According to this configuration, since the urging force of the urging spring can be appropriately adjusted to an optimum value by adjusting the adjustment portion, the optimum urging force required for mesh can be set in accordance with types (sizes, tooth shapes and others) of the sun gear and the planetary gear.

In the above-described configuration, it is possible to adopt a configuration in which the inspection unit includes a mesh detection mechanism that detects whether or not the sun gear has meshed with the planetary gears of the workpiece, and the mesh detection mechanism includes a detected portion provided on an outer periphery of the lower shaft at a predetermined position in the axial direction, and a detection sensor that is held by the lifting and lowering holder to face the detected portion and detects the presence/absence of the detected portion.

According to this configuration, since the mesh detection mechanism is constituted of the detected portion provided around the lower shaft and the detection sensor that is held by the lifting and lowering holder and arranged to face the detected portion (i.e., face from an outer side in a radial direction vertical to a moving direction of the lower shaft), relative movement between the lifting and lowering holder and the lower shaft in the vertical direction (a lifting and lowering direction) is detected while simplifying the construction, thereby assuredly detecting whether or not the sun gear has meshed with the planetary gear.

In the above-described configuration, it is possible to adopt a configuration that the lifting and lowering holder is provided with a lift mechanism that is capable of relatively upwardly lifting up at least the inspecting portion of the inspection unit with respect to the grasping arm of the holding unit.

According to this configuration, in a case where this work inspector and carrier is arranged in the last process in a processing line along which a series of processing is performed, inspection does not have to be performed when a workpiece is determined to be rejected in a previous processing process, and hence it is possible to prevent the inspecting portion from coming into contact with (meshing with) a workpiece to smoothly carry the workpiece since the lift mechanism previously lifts up the inspection unit when the lifting and lowering holder moves down and the grasping arm grasps the workpiece.

3. Advantageous Effect of the Invention

According to the work inspector and carrier having the above-described configuration, it is possible to obtain the work transfer and carrier that inspects and carries a workpiece such as a mechanical component or an electronic component while achieving simplification of the construction, miniaturization of the apparatus, realization of a low cost, reduction in overall time required for inspection and carriage and others, especially the work transfer and carrier that carries a planetary gear mechanism while inspecting (detecting a load torque) an assembled state of the planetary gear mechanism.

EXPLANATIONS OF LETTERS OR NUMERALS

Figure 1:
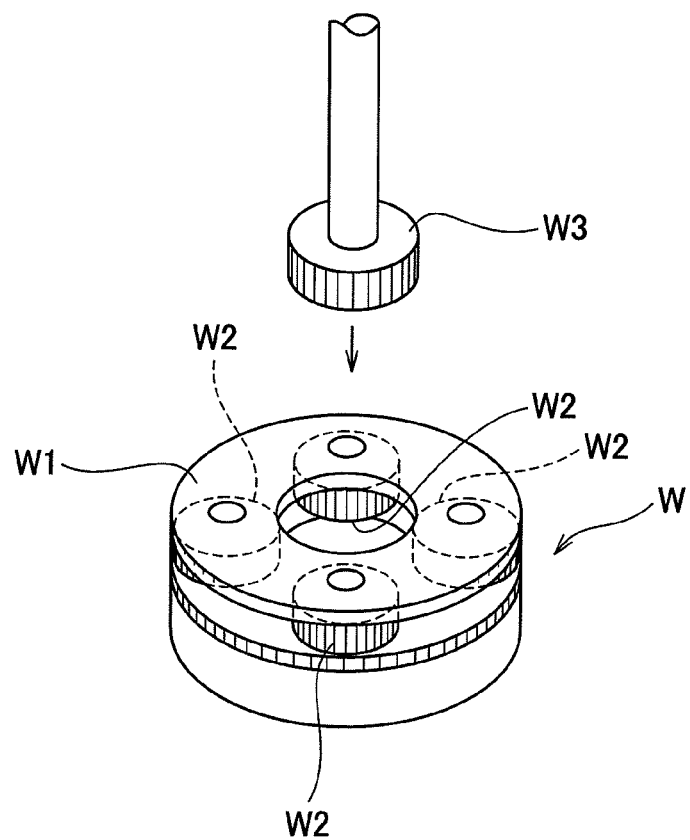
FIG. 1 is a perspective view showing a workpiece, which is a target of a work inspector and carrier according to the present invention.

W workpiece
W1 carrier
W2 planetary gear
W3 sun gear
10 base
20 vertical frame
30 horizontal frame
40 traveling body
50 lifting and lowering holder
51 frame portion
51a, 51b sidewall portion
51c upper wall portion
51d bottom wall portion
51d' through hole
51d'' accommodation groove
51e lower end flange portion
51f bracket portion
52 circular disk portion
52a opening portion
55 lift mechanism
55a actuator
55b lift arm
60 holding unit
61 grasping arm
62 arm drive mechanism
70 inspection unit
71 sun gear (inspecting portion)
72 rotation drive mechanism
72a motor (drive source)
72b upper shaft (drive shaft)
72c lower shaft (drive shaft)
72c' flange portion
73 load detection mechanism 73a torque detecting portion
74 pressing mechanism
74a urging spring
74b spring receiving portion
74b' opening portion
74c set collar (adjustment portion)
75 mesh detection mechanism
75a detected portion
75b detection sensor
80 lifting and lowering drive mechanism
81 motor
82 ball screw
83 ball nut
90 horizontal drive mechanism
91 motor
92 ball screw
93 ball nut
100 processing table (carry-in area)
110 accepted product carry-out line (carry-out area)
120 rejected product carry-out line (carry-out area)
R roller
B endless belt
M drive motor

DETAILED DESCRIPTION OF THE INVENTION

The present invention will now be described hereinafter with reference to the accompanying drawings. It is to be noted that a workpiece W that is a target of inspection and carriage is, as shown in FIG. 1, a planetary gear mechanism that is to be mounted in an automatic transmission of an automobile and the like, and a workpiece having a configuration in which planetary gears W2 are incorporated but a sun gear W3 is not incorporated in a carrier W1 is applied.

Figure 2:
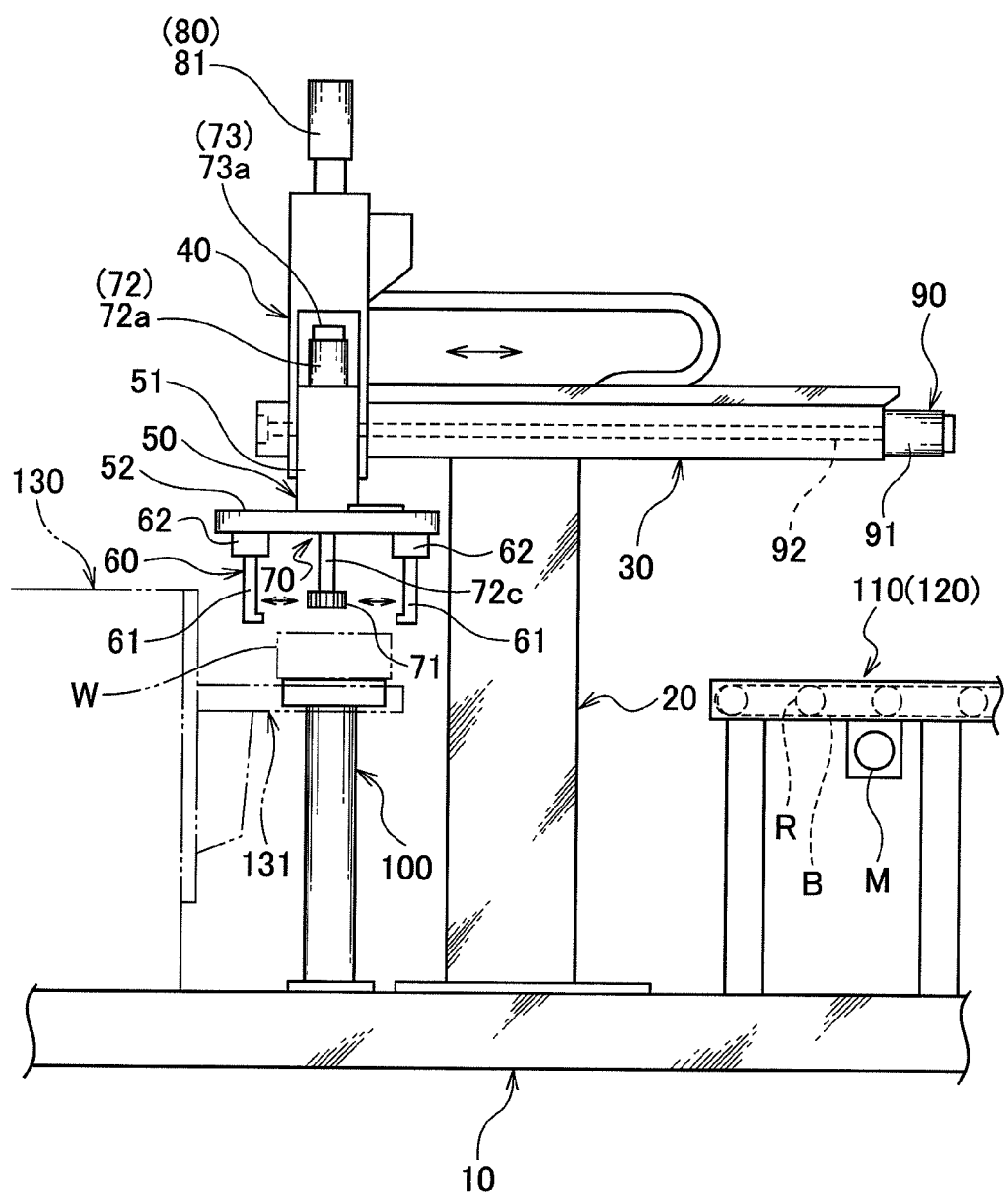
FIG. 2 is a front view showing an embodiment of the work inspector and carrier according to the present invention.
Figure 3:
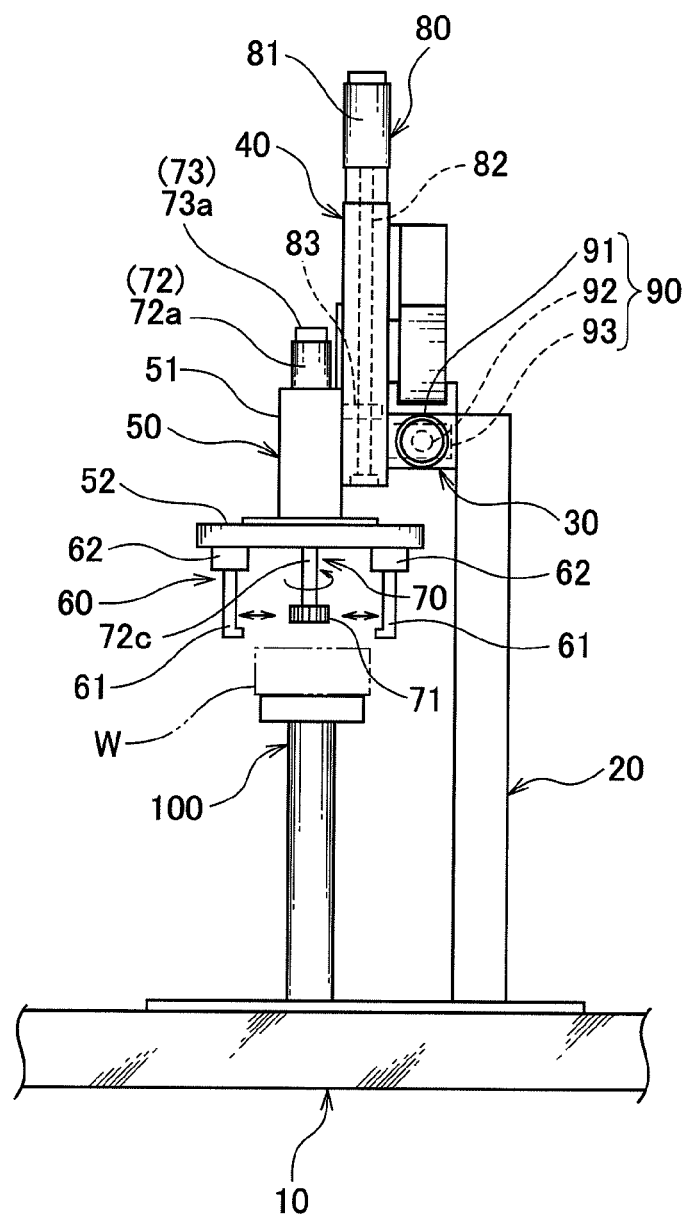
FIG. 3 is a side view showing an embodiment of the work inspector and carrier according to the present invention.
Figure 4:
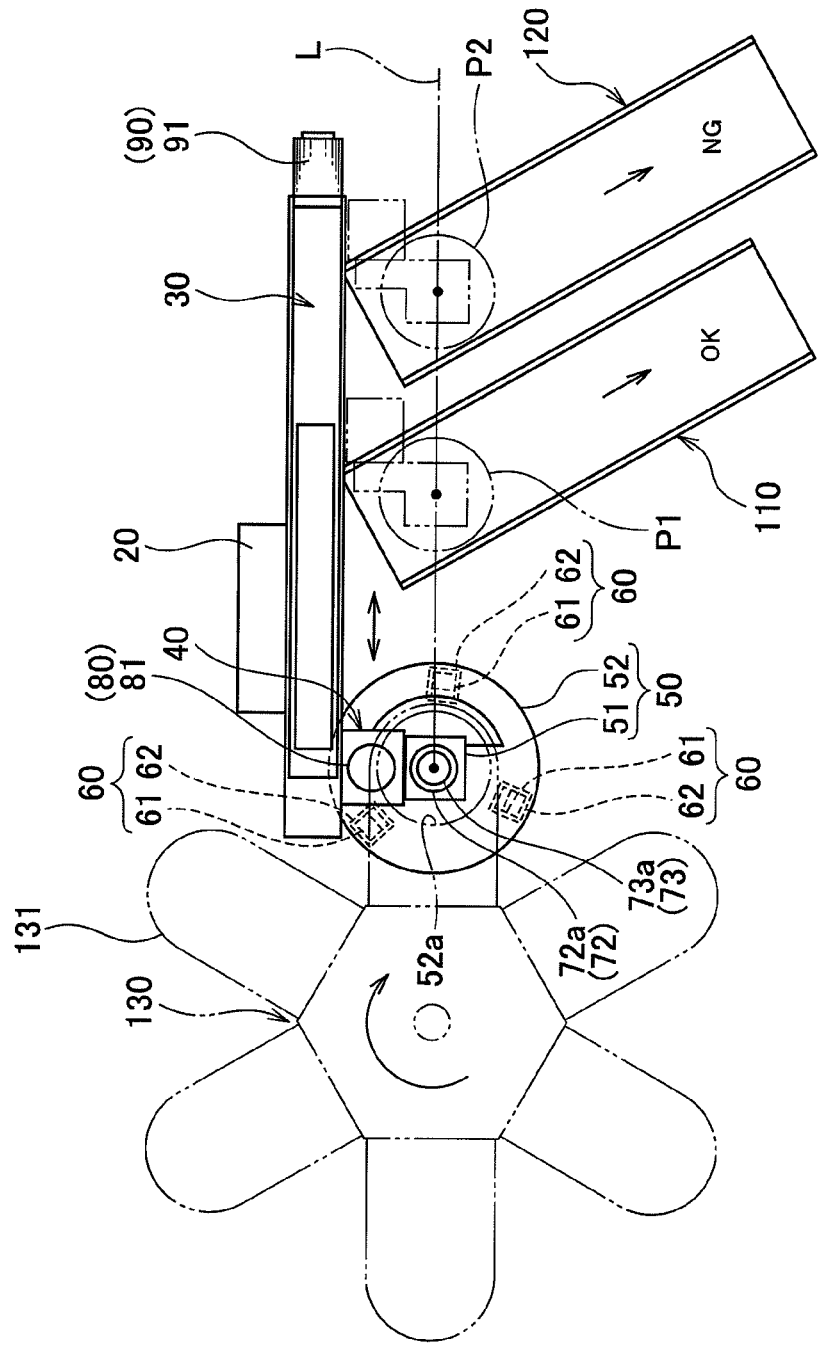
FIG. 4 is a plan view showing an embodiment of the work inspector and carrier according to the present invention.

As shown in FIG. 2 to FIG. 4, this work inspector and carrier includes a base 10, a vertical frame 20 fixed on the base 10, a horizontal frame 30 fixed at an upper end of the vertical frame 20, a traveling body 40 supported so as to enable its linear reciprocation along the horizontal frame 30, a lifting and lowering holder 50 supported so as to be movable upward and downward with respect to the traveling body 40, a holding unit 60 that is provided on the lifting and lowering holder 50 to hold a workpiece W, an inspection unit 70 that is provided on the lifting and lowering holder 50 to inspect the workpiece W, a lifting and lowering drive mechanism 80 provided on the traveling body 40 to move up and down the lifting and lowering holder 50, a horizontal drive mechanism 90 that is provided on the horizontal frame 30 to reciprocate the traveling body 40 in the horizontal direction, a control board (not shown) that performs various kinds of control, and others.

Further, on the base 10 are provided a processing table 100 that defines a carry-in area for the workpiece W, an accepted product carry-out line 110 and a rejected product carry-out line 120 which define a carry-out area to which the inspected workpiece W is carried out, a rotation table 130 that carries in the workpiece W onto the processing table 100, and others.

Here, the holding unit 60, the lifting and lowering holder 50, the traveling body 40, the lifting and lowering drive mechanism 80, the horizontal drive mechanism 90 and others constitute a carrier unit that carries the workpiece W from the carry-in area (the processing table 100) to the carry-out area (the accepted product carry-out line 110 or the rejected product carry-out line 120).

As shown in FIG. 2, the vertical frame 20 is formed with a height dimension with which the lifting and lowering holder 50 can move up and down without restriction when receiving the workpiece W from the carry-in area (the processing table 100) and delivering the workpiece to the carry-out area (the accepted product carry-out line 110 or the rejected product carry-out line 120).

As shown in FIG. 2 to FIG. 4, the horizontal frame 30 is fixed to an upper end portion of the vertical frame 20 and linearly formed to extend in parallel to a straight line L in the horizontal direction. Furthermore, the horizontal frame 30 supports the later-described traveling body 40 to reciprocate in the horizontal direction (a direction of the straight line L), and is formed so as to hold the later-described horizontal drive mechanism 90.

Here, although the horizontal frame 30 is formed so as to accommodate a ball screw 92 of the horizontal drive mechanism 90 therein, it is not limited thereto, and it may be formed so as to hold the ball screw along an outer side surface of the horizontal frame.

As shown in FIG. 2 to FIG. 4, a ball nut 93 of the later-described horizontal drive mechanism 90 is fixed to the traveling body 40, and the traveling body 40 is formed to be guided in such a manner that it can freely reciprocate in the horizontal direction (the direction of the straight line L) along a guide member (not shown) of the horizontal drive mechanism 90. Furthermore, the traveling body 40 is linearly (the direction of the straight line L) reciprocated along the horizontal frame 30 by the horizontal drive mechanism 90.

Moreover, the traveling body 40 is provided with the lifting and traveling drive mechanism 80 that drives the lifting and lowering holder 50 to move up and down in the vertical direction. It is to be noted that the traveling body 40 may be formed so as to accommodate a ball screw 82 of the later-described lifting and lowering drive mechanism 80, or may be formed so as to hold the ball screw 82 along an outer surface.

As shown in FIG. 2 to FIG. 5, the lifting and lowering holder 50 includes a frame portion 51 that is connected to the traveling body 40 so as to be movable upward and downward and is guided in the vertical direction, and a circular disk portion 52 fixed to a lower end of the frame portion 51.

As shown in FIG. 3, a ball nut 83 of the later-described lifting and lowering drive mechanism 80 is fixed to the frame portion 51, and the frame portion 51 is formed so as to be guided to allow its reciprocation in the vertical direction along a guide member (not shown) of the lifting and lowering drive mechanism 80. Furthermore, as shown in FIG. 5, the frame portion 51 is formed to include a sidewall portion 51a, a sidewall portion 51b, an upper wall portion 51c, a bottom wall portion 51d, a lower end flange portion 51e, a bracket portion 51f downwardly suspended from the bottom wall portion 51d.

Figure 5:
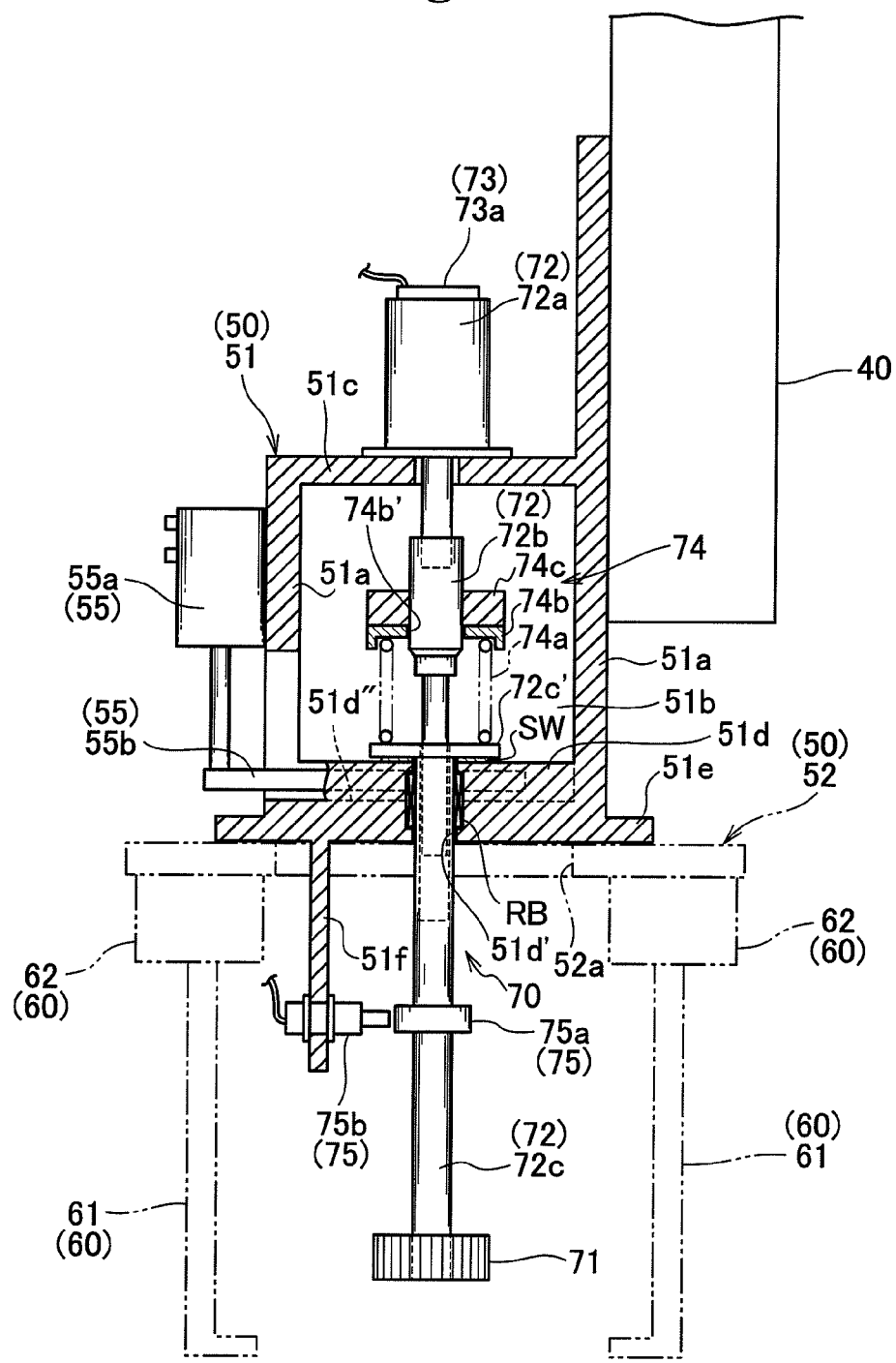
FIG. 5 is a cross-sectional view showing an inspection unit forming a part of the work inspector and carrier according to the present invention.
Figure 6:
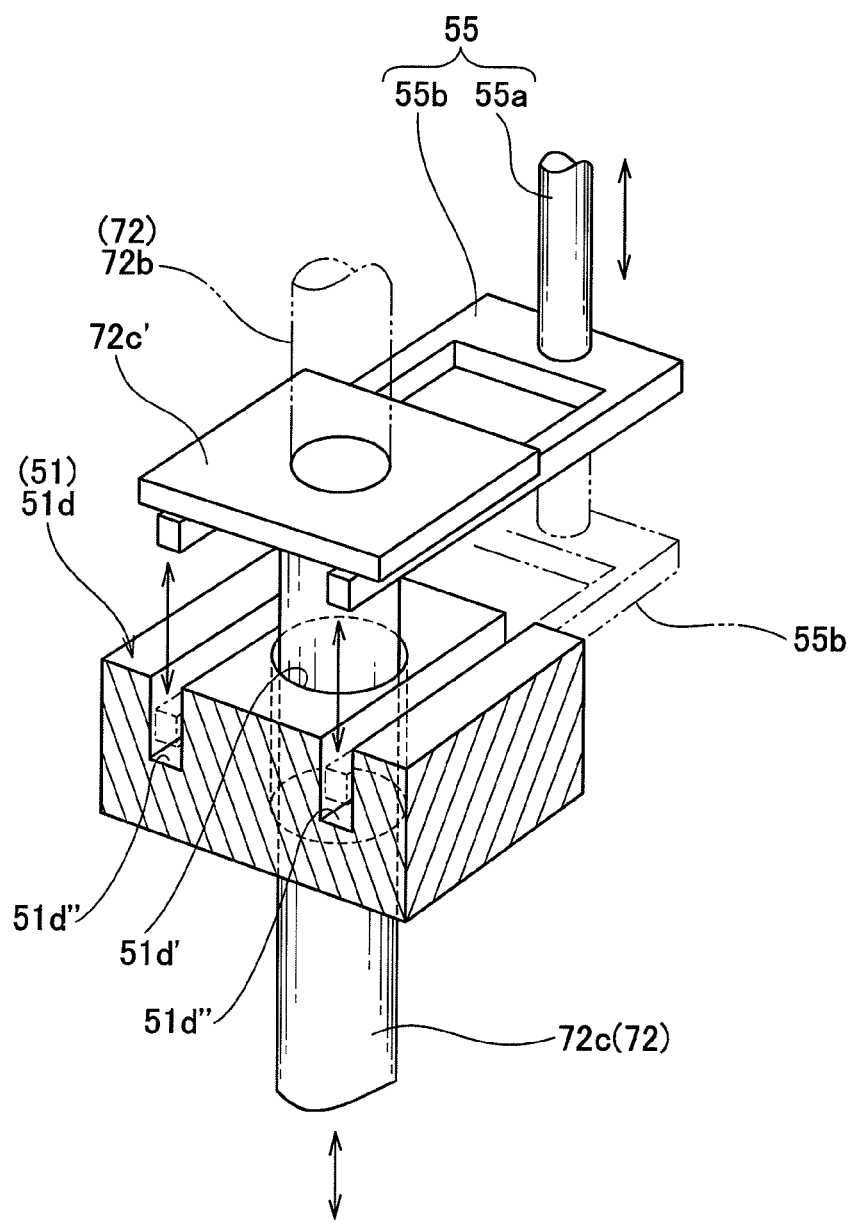
FIG. 6 is a partial perspective view showing a lift mechanism included in the work inspector and carrier according to the present invention.

As shown in FIG. 5 and FIG. 6, the bottom wall portion 51d includes a cylindrical through hole 51d' through which a later-described lower shaft 72c passes at a central region in a contactless manner and two accommodation grooves 51d" that are formed to extend in parallel to sandwich the through hole 51d' therebetween and are capable of accepting and accommodating a lift arm 55b of a later-described lift mechanism 55. Here, the accommodation grooves 51d" are formed to have a width dimension with which the lift arm 55b does not protrude from an upper surface of the bottom wall portion 51d when the lift arm 55b is accommodated.

Moreover, the bottom wall portion 51d supports an outer peripheral surface and a flange portion 72c' of a later-described lower shaft 72c to allow their rotation and vertical movement through a radial bearing RB provided on an inner periphery of the through hole 51d' and a washer SW arranged at an upper edge of the through hole 51d', and accommodates the lowered lift arm 55b in the accommodation grooves 51d".

As shown in FIG. 5, the bracket portion 51f is formed so as to fix a detection sensor 75b of a later-described mesh detection mechanism 75.

The circular disk portion 52 is connected to the lower end flange portion 51e of the frame portion 51, has a circular opening portion 52a through which the lower end shaft 72c of a later-described rotation drive mechanism 72 passes at the center, and is formed so as to hold a later-described three arm drive mechanisms 62 at positions provided at equal intervals (intervals of 120 degrees) in a circumferential direction.

Additionally, the lifting and lowering holder 50 is provided at the sidewall portion 51a with a lift mechanism 55 that relatively upwardly lifts up at least a detecting portion (a later-described sun gear 71) of the inspection unit 70 with respect to (later-described grasping arms 61 of) the holding unit 60.

As shown in FIG. 5 and FIG. 6, the lift mechanism 55 includes an actuator 55a such as a cylinder fixed to the sidewall portion 51a, the lift arm 55b that is driven to move up and down in the vertical direction by the actuator 55a, and others.

As shown in FIG. 5 and FIG. 6, the lift arm 55b is formed to have a fork-like shape, and is configured to move down to a predetermined height to enter the accommodation grooves 51d" of the bottom wall portion 51d to be buried therein in a pause state and, on the other hand, configured to move up to a predetermined height to lift up the flange portion 72c' of the lower shaft 72c from the lower side in an operated state.

Figure 9:
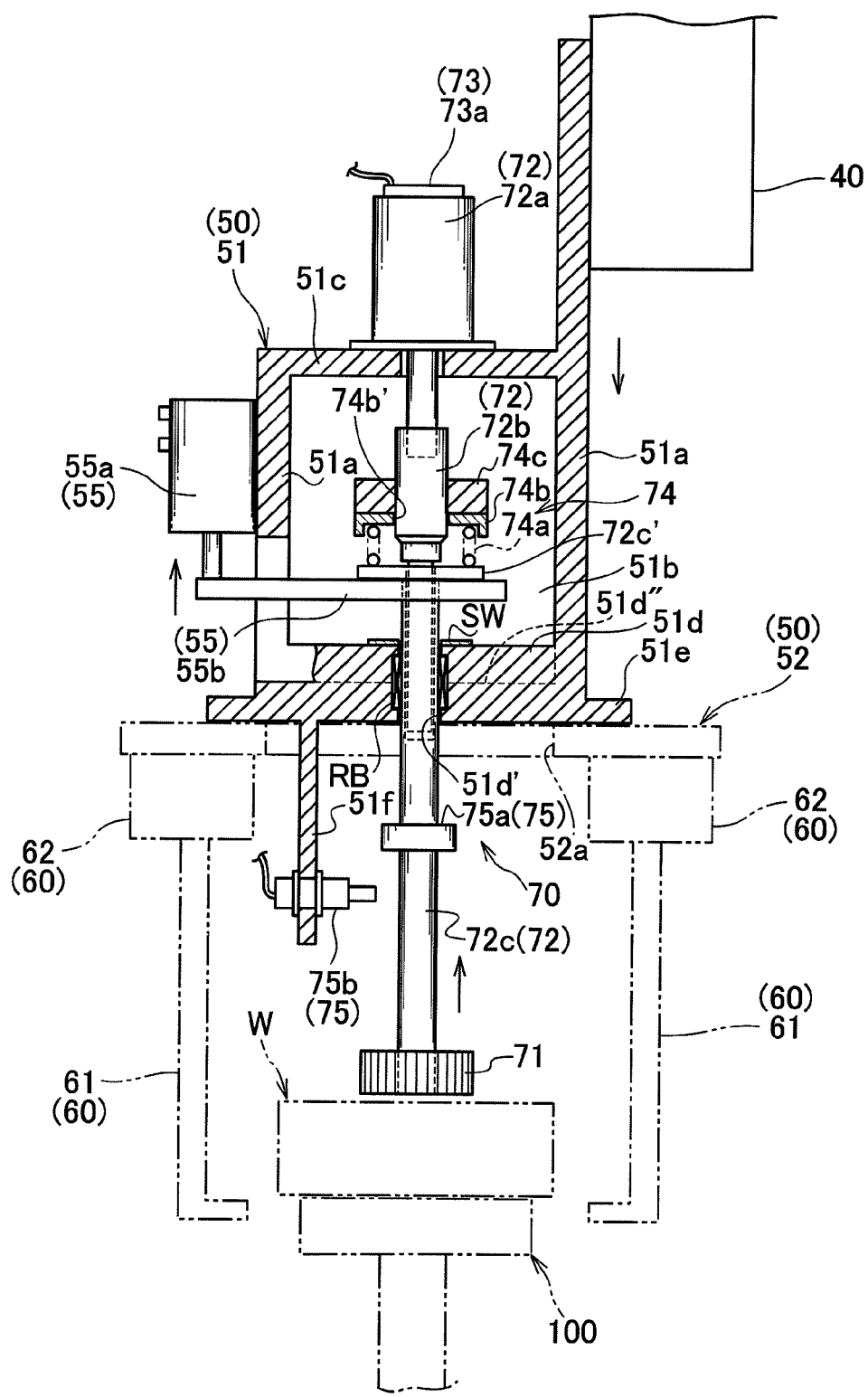
FIG. 9 is a cross-sectional view showing a state in which an inspecting portion of the inspection unit is lifted up by the lift mechanism when performing no inspection in the work inspector and carrier according to the present invention.

Further, when inspection of the workpiece W is not required, as shown in FIG. 9, the inspecting portion is lifted up by the lift mechanism 55 in advance, whereby the inspecting portion can be prevented from coming into contact with (meshing with) the workpiece W to smoothly carry the workpiece W.

That is, in a case where this work inspector and carrier is arranged at a last step in a processing line along which a series of processing is performed, since inspection does not have to be performed when the workpiece W is rejected at a previous processing step, the inspecting portion can be prevented from coming into contact with (meshing with) the workpiece W by lifting up the inspecting portion by the lift mechanism 55 in advance, thereby smoothly carrying the workpiece W when the lifting and lowering holder 50 moves down and grasps the workpiece W by (the later-described grasping arm 61 of) the holding unit 60.

As shown in FIG. 2 to FIG. 5, the holding unit 60 is provided on a lower surface of the circular disk portion 52 and includes three grasping arms 61, arm drive mechanisms fixed to the circular disk portion 52 so as to reciprocate the respective three grasping arms 61 in a radial direction of the circular disk portion 52, and others.

Each grasping arm 61 has a grasping portion that is capable of coming into contact with an outer peripheral surface of the workpiece W in the lower region, and an upper end portion thereof is connected to each arm drive mechanism 62.

The arm drive mechanism 62 reciprocates each grasping arm 61 in the radial direction of the circular disk portion 52 and, for example, a cylindrical actuator is adopted as a driving source of this mechanism.

That is, the three grasping arms 61 are driven in synchronization with each other by the three arm drive mechanisms 62, grasp (hold) the outer peripheral surface of the workpiece W in cooperation with each other by moving closer to the center and, on the other hand, get away from the outer peripheral surface of the workpiece W to release the workpiece W by moving away from the center.

Further, the holding unit 60 is driven so as to freely move between the carry-in area (the processing table 100) and the carry-out area (the accepted product carry-out line 110 or the rejected product carry-out line 120) through the lifting and lowering holder 50 and the traveling body 40.

In this manner, since the grasping arms 61 that grasp the workpiece W and the arm drive mechanisms 62 that drive the grasping arms 61 are adopted as the holding unit 60, synchronously driving the three grasping arms 61 by the arm drive mechanisms 62 enables grasping the workpiece W or releasing the grasped workpiece W at a desired timing, and the workpiece W can be assuredly held and carried even if it is a relatively heavyweight item.

It is to be noted that the arm drive mechanism 62 is not limited to the cylindrical actuator, and a screw feed mechanism using a ball screw and a ball nut, an electromagnetic actuator using a solenoid and others can be adopted.

As shown in FIG. 2 to FIG. 5, the inspection unit 70 includes the sun gear 71 as an inspecting portion that is capable of meshing with the planetary gears W2 of the workpiece W, the rotation drive mechanism 72 that drives the sun gear 71 to rotate, a load detection mechanism 73 that detects a load torque of the rotation drive mechanism 72, a pressing mechanism 74 that increases pressing force in a meshing direction while making the sun gear 71 come into contact with the planetary gears W2 and stopping the downward movement of the sun gear in accordance with a load against a meshing operation when moving down the sun gear 71 to mesh with the planetary gears W2 of the workpiece W, a mesh detection mechanism 75 that detects whether or not the sun gear 71 has meshed with the planetary gears W2 of the workpiece W, and others.

The sun gear 71 is to be positioned below the center of the lifting and lowering holder 50 (the circular disk portion 52), and is formed so as to be attachable and detachable with respect to the lower end portion of the lower shaft 72c. Furthermore, the sun gear 71 is prepared in accordance with a type of the planetary gears W2 of the workpiece W and can be appropriately replaced based on a change of the workpiece W.

The rotation drive mechanism 72 includes a motor 72a as a drive source fixed on the upper wall portion 51c of the frame portion 51, an upper shaft 72b forming a part of the drive shaft that is directly coupled with the motor 72a and driven to rotate, a lower shaft 72c forming a part of the drive shaft that is connected to the upper shaft 72b to be movable in an axial direction (the vertical direction) and to integrally rotate with the upper shaft 72b and detachably connects the sun gear 71 at a lower end portion thereof.

The lower shaft 72c integrally includes a flange portion 72c' that abuts on the bottom wall portion 51d (via the washer SW) in a state in which the lower shaft is arranged to pass through the through hole 51d' of the bottom wall portion 51d (of the frame portion 51).

Furthermore, the rotation drive mechanism 72 drives the sun gear 71 to rotate based on rotation of the motor 72a through the upper shaft 72b and the lower shaft 72c (the drive shaft) which integrally rotate. It is to be noted that the flange portion 72c' of the lower shaft 72c is supported in the axial direction through the washer SW, but a thrust bearing or the like may be interposed in place of the washer SW when the sun gear 71 is a heavyweight item.

As shown in FIG. 5, the load detection mechanism 73 includes a torque detecting portion 73a connected to an upper portion of the motor 72a, a controller (not shown) provided in a control board (not shown) apart from the lifting and lowering holder 50, and is formed to detect a load torque that is exercised on the sun gear 71. Further, information concerning the load torque detected by the torque detecting portion 73a of the load detection mechanism 73 is supplied to the controller through a cable to be compared with data previously stored in the controller, and the workpiece W is determined as an accepted product (OK) when a comparison result is equal to or below a predetermined level, while the workpiece W is determined as a rejected product (NG) when the comparison result exceeds the predetermined level.

As shown in FIG. 5, the pressing mechanism 74 includes an urging spring 74*a* which downwardly urges the flange portion 72*c'* of the lower shaft 72*c* toward the bottom wall portion 51*d* in a state in which the lower shaft 72*c* integrally rotates with the upper shaft 72*b* and is connected to the upper shaft 72*b* so as to be relatively movable in the vertical direction (the axial direction), a spring receiving portion 74*b* that has a circular opening portion 74*b'* through which the upper shaft 72*b* passes and allows abutment of the upper end of the urging spring 74*a* in a compressed state, a set collar 74*c* as an adjustment portion connected to the upper shaft 72*b* so as to adjust a height position of the spring receiving portion 74*b*.

The urging spring 74*a* is a coil compression spring, and is compressed for a predetermined amount to maintain a state where its lower end portion abuts on the flange portion 72*c'* and its upper end portion abuts on the spring receiving portion 74*b*.

As shown in FIG. 5, a height position of the spring receiving portion 74*b* in the vertical direction is appropriately set by adjusting a height position of the set collar 74*c*, whereby a compression amount of the urging spring 74*a* can be adjusted. That is, the set collar 74*c* functions as an adjustment portion that adjusts the urging force of the urging spring 74*a*.

Since the adjustment portion that is capable of adjusting urging force of the urging spring 74*a* is provided in this manner, the urging force of the urging spring 74*a* can be adjusted to a desired value and therefore, optimum urging force required for mesh can be set in accordance with types (sizes, tooth shapes and others) of the sun gear 71 and the planetary gears W2 of the workpiece W.

As shown in FIG. 5, the mesh detection mechanism 75 includes an annular detected portion 75*a* that is provided at a predetermined height position in the axial direction at the outer periphery of the lower shaft 72*c*, a detection sensor 75*b* that is fixed to the bracket 51*f* downwardly suspended from the bottom wall portion 51*d* of the frame portion 51 and arranged to face the detected portion 75*a* in the horizontal direction.

Figure 7:
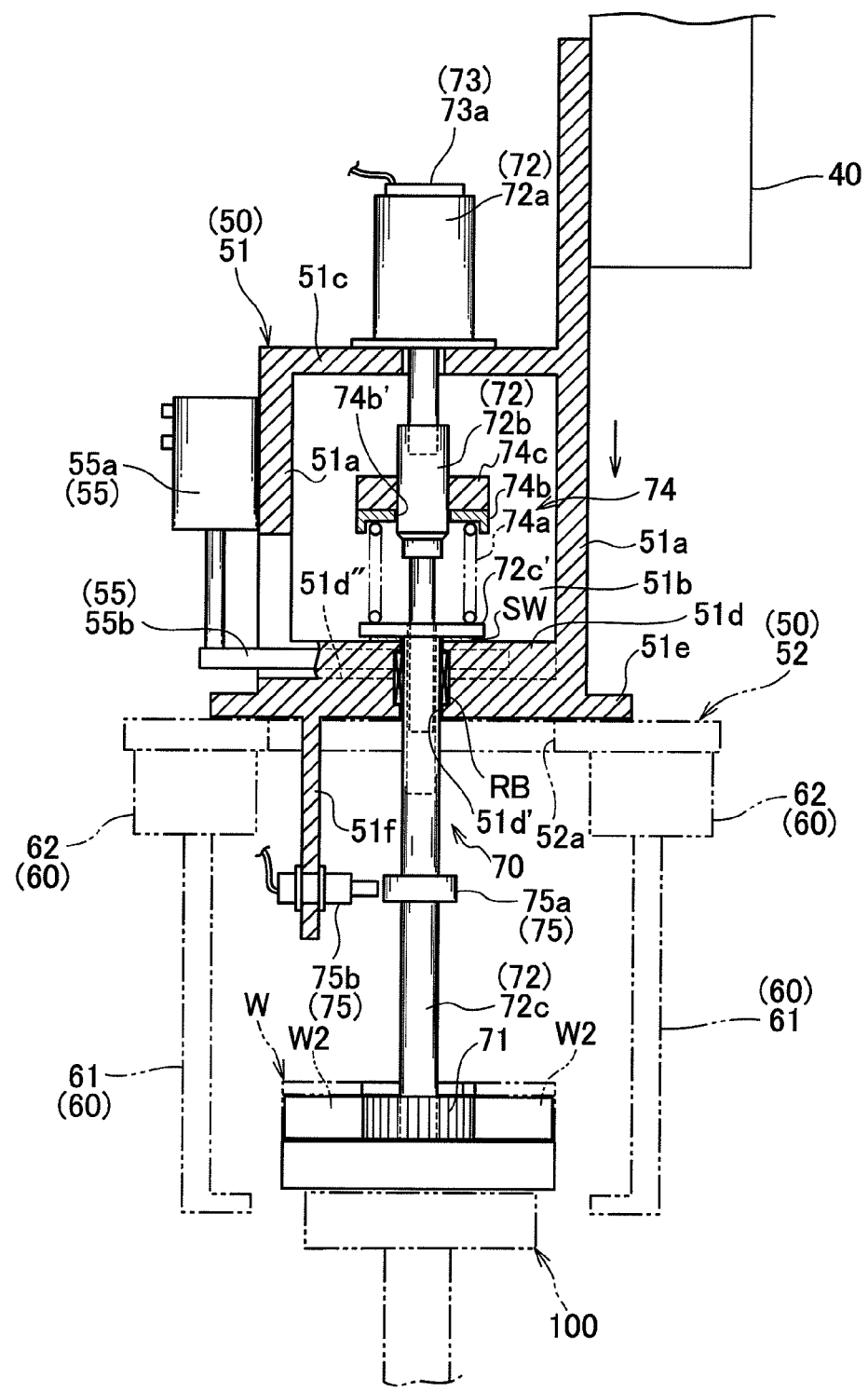
FIG. 7 is a cross-sectional view showing a state in which a sun gear in an inspection unit forming a part of the work inspector and carrier according to the present invention meshes with planetary gears of a workpiece.
Figure 8:
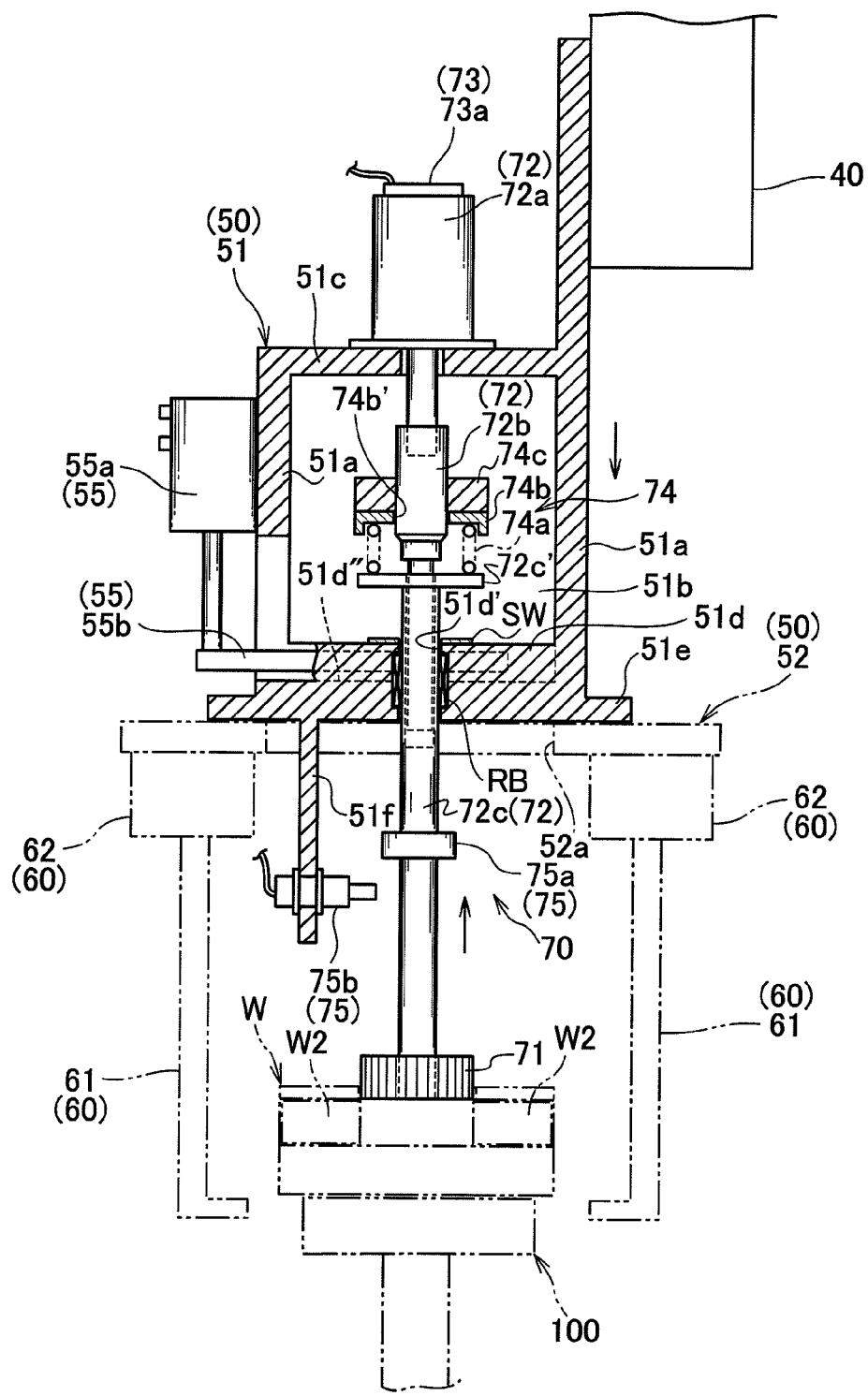
FIG. 8 is a cross-sectional view showing a state in which pressing force provided by a pressing mechanism increases in a state where the sun gear in the inspection unit forming a part of the work inspector and carrier according to the present invention comes into contact with the planetary gears without meshing.

Furthermore, the mesh detection mechanism 75 is configured so as to detect that the sun gear 71 is meshing with the planetary gears W2 of the workpiece W when the detection sensor 75*b* still faces the detected portion 75*a* even though the lifting and lowering holder 50 moves down to be positioned at a height position where the grasping arms 61 can grasp the workpiece W as shown in FIG. 7 and, on the other hand, so as to detect that the sun gear 71 does not mesh with the planetary gears W2 of the workpiece W when the lower shaft 72*c* and the sun gear 71 relatively upwardly move with respect to the lifting and lowering holder 50 (the grasping arms 61) as shown in FIG. 8 at the time that the lifting and lowering holder 50 moves down to the height position where the grasping arms 61 can grasp the workpiece W.

That is, since the mesh detection mechanism 75 having the above-described configuration can detect whether or not the sun gear 71 has meshed with the planetary gears W2, inspection can be highly accurately and smoothly carried out based on this detection signal.

Further, the inspection unit 70 is to be moved (carried) together with the workpiece W held by the holding unit 60 via the lifting and lowering holder 50 and the traveling body 40.

Therefore, when the workpiece W is carried from the carry-in area (the processing table 100) to the carry-out area (the accepted product carry-out line 110 or the rejected product carry-out line 120) by the carrier unit, the inspection unit 70 can perform a predetermined inspection with respect to the workpiece W while being moved together with the workpiece W, and an overall time required for the inspection and the carriage can be reduced as compared with a case where the workpiece W is stopped at a predetermined inspecting position to perform the inspection and then the workpiece W is carried (the inspection and the carriage are separately independently performed).

Furthermore, since the inspection unit 70 is formed to perform predetermined inspection with respect to the workpiece W in a state where the workpiece W is held (grasped) by the holding unit 60, the predetermined inspection can be highly accurately performed while assuredly positioning the workpiece W at a predetermined holding position and carrying the workpiece.

As shown in FIG. 2 and FIG. 3, the lifting and lowering drive mechanism 80 includes a motor 81 provided at an upper portion of the traveling body 40, the ball screw 82 that is arranged in the traveling body 40 to be directly coupled with the motor 81 and extends in the vertical direction, the ball nut 83 which is fixed to the frame portion 51 of the lifting and lowering holder 50 and to which the ball screw 82 is screwed.

Moreover, the lifting and lowering holder 50 is moved down together with the ball nut 83 when the ball screw 82 rotates in one direction based on start of the motor 81 and, on the other hand, the lifting and lowering holder 50 is moved up together with the ball nut 83 when the ball screw 82 rotates in a reverse direction.

It is to be noted that the lifting and lowering drive mechanism 80 is not limited to the screw feed mechanism using the motor 81, the ball screw 82 and the ball nut 83, and a cylindrical actuator, an electromagnetic actuator using a solenoid and others may be adopted.

As shown in FIG. 2 and FIG. 3, the horizontal drive mechanism 90 includes a motor 91 provided at one end portion of the horizontal frame 30, the ball screw 92 that is arranged in the horizontal frame 30 to be directly coupled with the motor 91 and extends in the horizontal direction, the ball nut 93 which is fixed to the traveling body 40 and to which the ball screw 92 is screwed.

Additionally, the traveling body 40 is moved together with the ball nut 93 in the horizontal direction (the direction of the straight line L) from the carry-in area toward the carry-out area side when the ball screw 92 rotates in one direction based on the start of the motor 91 and, on the other hand, the traveling body 40 is moved together with the ball nut 93 from the carry-out area side toward the carry-in area side when the ball screw 92 rotates in the reverse direction.

Further, as shown in FIG. 4, the horizontal drive mechanism 90 is driven so as to carry and position the workpiece W in a first carry-out position P1 whereat the workpiece W (an accepted product) accepted by the inspection unit 70 is carried out to a second carry-out position P2 whereat the workpiece W (a rejected product) rejected by the inspection unit 70 is carried out. Here, the first carry-out position P1 is placed immediately above the accepted product carry-out line 110 and the second carry-out position P2 is placed immediately above the rejected product carry-out line 120.

That is, the workpiece W is carried to the first carry-out position P1 or the second carry-out position P2 aligned on the straight line L by the horizontal drive mechanism 90 (the workpiece W accepted by the inspection unit 70 is carried to the first carry-out position P1, and the workpiece W rejected by the inspection unit 70 is carried to the second carry-out position P2).

In this manner, since the workpiece W is linearly (one-dimensionally) carried in the horizontal direction, simplification of the carrier unit, i.e., the entire apparatus, miniaturization and reduction in cost can be achieved as compared with a case where the workpiece W is two-dimensionally carried on a horizontal plane.

It is to be noted that the horizontal drive mechanism is not limited to the screw feed mechanism using the motor 91, the ball screw 92 and the ball nut 93, and a cylindrical actuator, an electromagnetic actuator using a solenoid and others may be adopted.

As described above, since the carrier unit includes the lifting and lowering drive mechanism 80 that moves up and down the holding unit 60 and the inspection unit 70 together and the horizontal drive mechanism 90 that linearly drives the holding unit 60 and the inspection unit 70 together in the horizontal direction (the direction of the straight line L), the operation in which the holding unit 60 moves up and down to hold or release the workpiece W can be synchronized with the operation in which the inspection unit 70 comes into contact with the workpiece W to start inspection (prepare inspection) and the operation in which the inspection unit 70 is separated away or moved away from the workpiece W to terminate the inspection (or the operation that the inspection unit 70 is separated in the state that the inspection has been terminated) (these operations can be simultaneously carried out in parallel), and simplification of the lifting and lowering drive mechanism, i.e., the entire apparatus, miniaturization, reduction in cost and others can be achieved as compared with a case where the holding unit 60 and the inspection unit 70 are separately driven to move up and down.

As shown in FIG. 2, the processing table 100 is formed so as to support the workpiece W, which has been transferred from the rotation table 130, at a predetermined height position.

It is to be noted that the processing table 100 may be integrally provided with a fixing mechanism, which temporarily fixes the supported workpiece W, or a processing unit that performs any other processing.

The accepted product carry-out line 110 is to define a part of the carry-out area and, as shown in FIG. 2 and FIG. 4, is a belt conveyer that is arranged immediately below the first carry-out position P1 aligned on the straight line L and includes a roller R, an endless belt B and a drive motor M, and the workpiece W that is an accepted product released from the holding unit 60 is mounted on the accepted product carry-out line 110 to be carried out.

The rejected product carry-out line 120 is to define a part of the carry-out area and, as shown in FIG. 2 and FIG. 4, is a belt conveyer that is arranged immediately below the second carry-out position P2 aligned on the straight line L and includes a roller R, an endless belt B and a drive motor M, and the workpiece W that is a rejected product released from the holding unit 60 is mounted on the rejected product carry-out line 120 to be carried out.

As shown in FIG. 2 and FIG. 4, the rotation table 130 includes a plurality of holding and transfer units 131 that are capable of supporting the workpieces W and transferring the workpiece onto the processing table 100, and is an index type table that is driven to rotate in a predetermined angle steps.

Further, the rotation table 130 is formed in such a manner that the workpiece W subjected to an operation of assembling the planetary gears W2 with respect to the carrier W1 through various processes is transferred onto the processing table 100 in order to be carried out from this work area to the external carry-out area (the accepted product carry-out line 110 or the rejected product carry-out line 120).

Next, an operation of the work inspector and carrier having the above-described configuration will now be described.

First, the workpiece W is transferred onto the processing table 100 as the carry-in area by the rotation table 130.

Then, the traveling body 40 is horizontally driven by the horizontal drive mechanism 90 in a direction along which the traveling body 40 gets closer to the processing table 100 so as to position the lifting and lowering holder 50 above the workpiece W.

Subsequently, the lifting and lowering holder 50 is moved down to a predetermined height position by the lifting and lowering drive mechanism 80, and the grasping arms 61 of the holding unit 60 are positioned at positions corresponding to the outer peripheral surface of the workpiece W as shown in FIG. 7. At the same time, the sun gear 71 of the detection unit 70 enters the workpiece W to mesh with the planetary gears W2. It is to be noted that the sun gear 71 may be inserted into the workpiece W while being appropriately rotated by the rotation drive mechanism so that mesh of the sun gear 71 can be smoothly performed.

Here, at the time that the lifting and lowering holder 50 moves down the grasping arms 61 to the predetermined height positions, when the sun gear 71 comes into contact with the planetary gears W2 without smoothly meshing with the planetary gears W2, the lower shaft 72c relatively moves up with respect to the lifting and lowering holder 50 as shown in FIG. 8, the mesh detection mechanism 75 detects that these gears do not mesh with each other, and the urging spring 74a is compressed to increase the urging force. Furthermore, the sun gear 71 is pressed by the increased urging force to be assuredly meshed with the planetary gears W2 as shown in FIG. 7. At the same time, the mesh detection mechanism 75 detects that these gears have meshed with each other.

Subsequently, the three grasping arms 61 of the holding unit 60 are synchronously driven by the arm drive mechanism 62 to grasp the workpiece W.

Thereafter, in a state in which the workpiece W is held by the holding unit 60, the lifting and lowering holder 50 is moved up to a predetermined height position by the lifting and lowering drive mechanism 80.

Additionally, the traveling body 40 is linearly and horizontally driven by the horizontal drive mechanism 90, and the workpiece W held by the holding unit 60 is carried to the carry-out area (the accepted product carry-out line 110 or the rejected product carry-out line 120) side together with the lifting and lowering holder 50 and the detection unit 70.

Here, the inspection of the workpiece W by the inspection unit 70 is started simultaneously with the moving-up operation of the lifting and lowering holder 50 or after elapse of a predetermined time.

In this inspection, the load detection mechanism 73 detects a load torque while rotating the sun gear 71 by the rotation drive mechanism 72, and the workpiece W is accepted when a value of the detected load torque is equal to or below a predetermined level, while the workpiece W is rejected when the detected load torque exceeds the predetermined level. Further, this inspection is terminated before the workpiece W reaches the first carry-out position P1 from the carry-in area (the processing table 100) side.

Furthermore, the traveling body 40 is stopped so as to position the workpiece W at the first carry-out position P1 when the carried workpiece W is determined as an accepted product by the inspection unit 70 and, on the other hand, the traveling body 40 is stopped so as to position the workpiece W at the second carry-out position P2 when the carried workpiece W is determined as a rejected product.

Moreover, the lifting and lowering holder 50 is moved down to a predetermined height position by the lifting and lowering drive mechanism 80 at the first carry-out position P1 or the second carry-out position P2, and the three grasping arms 61 are synchronously driven to release the workpiece W.

As a result, the workpiece W that is an accepted product is delivered to the accepted product carry-out line 110, and the workpiece W that is a rejected product is delivered to the rejected product carry-out line 120.

As described above, when the workpiece W is carried from the carry-in area (the processing table 100) to the carry-out area (the accepted product carry-out line 110 or the rejected product carry-out line 120), the predetermined inspection is performed with respect to the workpiece W while moving (carrying) the inspection unit 70 together with the workpiece W. Therefore, an entire time required for the inspection and the carriage can be reduced as compared with a case where the workpiece W is stopped at a predetermined inspecting position to perform the inspection and then the workpiece W is carried (the inspection and the carriage are separately and independently performed).

It is to be noted that, when the inspection for the workpiece W has been determined to be no longer required in a process on an upstream side, the sun gear 71 is prevented from meshing with the planetary gears W2 of the workpiece W by lifting the sun gear 71 by using the lift mechanism 55 in advance as shown in FIG. 9, the lifting and lowering holder 50 is moved down to a predetermined height position, the grasping arms 61 grasp the workpiece W, and the workpiece W is delivered to the rejected product carry-out line 120.

In the foregoing embodiment, although the example where the sun gear 71 is provided as the inspecting portion which detects a load torque of the planetary gears W2 included in the workpiece W has been described as the inspection unit 70, the present invention is not limited thereto, and an inspection unit that inspects any other mechanical component or electronic component for surface defects and others in a contact manner (in an engaged state) or a contactless manner (in an approximated state) or an inspection unit that inspects electrical conduction of an electronic component in a contact manner (in an engaged state) may be applied, for example.

In the foregoing embodiment, although the example where the grasping arms 61 and the arm driving mechanisms are provided as the holding unit 60 that holds the workpiece W, and the grasping arms grasp the workpiece W has been described, the present invention is not limited thereto, and a holding unit that absorbs the workpiece W by suction to hold the workpiece W or adsorbs the workpiece W by using magnetic force to hold the workpiece W may be adopted.

In the foregoing embodiment, although the example where one type of the grasping arms 61 for holding the workpiece W has been described, the present invention is not limited thereto, and various grasping arms suitable for different workpiece shapes may be prepared, and the grasping arms may be replaced with suitable grasping arms in accordance with a change in the type of the workpiece W.

In the foregoing embodiment, although the example where the holding unit 60 and the inspection unit 70 are linearly (one-dimensionally) driven together in the horizontal direction has been described as the horizontal drive mechanism 90, the present invention is not limited thereto, and a mechanism that performs planar (two-dimensional driving) may be adopted if driving is effected in the horizontal direction.

In the foregoing embodiment, although the carrier unit that performs lifting and lowering driving and horizontal driving has been described as the carrier unit, the present invention is not limited thereto, and a unit that draws a curved path and three-dimensionally moves to perform a carriage operation may be adopted as long as it carries the workpiece W from the predetermined carry-in area to the carry-out area.

As described above, since the work inspector and carrier according to the present invention can achieve simplification of the configuration, miniaturization of the apparatus, realization of a low cost, reduction in the entire time required for the inspection and carriage and others, it can be of course applied to a planetary gear mechanism production line which performs carriage while inspecting an assembled state (inspecting, e.g., a load torque) of the planetary gear mechanism, and it is also useful in any other mechanical component production line, an electronic device component production line and other fields involving carriage and inspection of workpieces.

The invention claimed is:

1. A work inspecting and carrying device for carrying and inspecting a workpiece having a planetary gear mechanism in which a plurality of planetary gears are incorporated in a planetary carrier without a sun gear, the work inspecting and carrying device comprising:
a holding unit for holding the planetary carrier of the workpiece;
an inspection unit including a sun gear, the inspection unit being operable to inspect a load torque of the sun gear while meshing the sun gear with the planetary gears of the workpiece held by the holding unit; and
a carrier unit for carrying the holding unit and the inspection unit together,
wherein the carrier unit includes a lifting and lowering holder that holds the holding unit and the inspection unit, a lifting and lowering drive mechanism that drives the lifting and lowering holder to move up and down, and a horizontal drive mechanism that drives the lifting and lowering holder in a horizontal direction,
wherein the holding unit is provided at an underside of the lifting and lowering holder and includes a plurality of grasping arms for grasping sides of the workpiece, and an arm drive mechanism for driving the grasping arms,
wherein the sun gear of the inspection unit is disposed under the lifting and lowering holder and at a center of the grasping arms;
wherein the inspection unit further includes a rotation drive mechanism for rotatably driving the sun gear, a load detection mechanism for detecting a load of the rotation drive mechanism, and a pressing mechanism for increasing pressing force in a direction along which the sun gear is meshed with the planetary gears while making the sun gear come into contact with the planetary gears and stopping downward movement of the sun gear in accordance with a load against a meshing operation when moving down the sun gear to mesh with the planetary gears of the workpiece,
wherein the rotation drive mechanism includes a drive source fixed to the lifting and lowering holder, and a drive shaft that is rotatably driven by the drive source and coupled with the sun gear at a lower end thereof,
the drive shaft includes an upper shaft rotatably driven by the drive source and a lower shaft connected to the upper shaft so as to be movable in an axial direction and to integrally rotate with the upper shaft,
the sun gear is connected to a lower end of the lower shaft, and the pressing mechanism includes an urging spring that downwardly urges the lower shaft with respect to the upper shaft.

2. The work inspecting and carrying device according to claim 1, wherein the inspection unit includes a mesh detection mechanism that detects whether the sun gear has meshed with the planetary gears of the workpiece.

3. The work inspecting and carrying device according to claim 1, wherein the pressing mechanism includes an adjustment portion that adjusts an urging force of the urging spring.

4. The work inspecting and carrying device according to claim 1,
wherein the inspection unit includes a mesh detection mechanism that detects whether the sun gear has meshed with the planetary gears of the workpiece, and
the mesh detection mechanism includes a detected portion provided on an outer periphery of the lower shaft at a predetermined position in the axial direction, and a detection sensor that is held by the lifting and lowering holder so as to face the detected portion and detects presence/absence of the detected portion.

5. The work inspecting and carrying device according to claim 1, wherein the lifting and lowering holder is provided with a lift mechanism that is capable of relatively upwardly lifting up at least the sun gear of the inspection unit with respect to the grasping arms of the holding unit.

6. The work inspecting and carrying device according to claim 1,
wherein the horizontal drive mechanism drives the lifting and lowering holder in the horizontal direction between a carry-in area into which the workpiece is carried and a carry-out area at which the workpiece is released; and
the carry-out area includes a first carry-out position whereat the workpiece accepted by the inspection unit is carried out and a second carry-out position whereat the workpiece rejected by the inspecting unit is carried out.

* * * * *